United States Patent [19]

Demin et al.

[11] 4,088,503
[45] May 9, 1978

[54] BACKING FOR WELD UNDERSIDE FORMATION

[76] Inventors: Alexandr Viktorovich Demin, ulitsa Plekhanova, 28, korpus 2, kv. 105, Moscow; Igor Nikolaevich Balezin, 1 Mikroraion, 6, kv. 24, Mtsensk Orlovskoi oblasti; Konstantin Alexeevich Kosinsky, ulitsa Uritskogo, 8, kv. 29, Ljubertsy Moskovskoi oblasti; Vladimir Nikolaevich Serebrennikov, prospekt Lenina, 28, kv. 59, Orsk Orenburgskoi oblasti; Vadim Likarionovich Popov, 5, kv. 38, Lytkarino Moskovskoi oblasti; Nikolai Nikolaevich Shipkov, ulitsa Moldogulovoi, 18, korpus 2, kv. 157; Eduard Fedorovich Dovguchits, Bezbozhny pereulok, 38, kv. 66, both of Moscow, all of U.S.S.R.

[21] Appl. No.: 712,663

[22] Filed: Aug. 9, 1976

[51] Int. Cl.$^2$ .............................................. C04B 35/52
[52] U.S. Cl. .................................................... 106/56
[58] Field of Search ......................................... 106/56

[56] References Cited

U.S. PATENT DOCUMENTS

| | | | |
|---|---|---|---|
| 2,104,841 | 1/1938 | White | 106/56 |
| 2,270,199 | 1/1942 | Thrune | 106/56 |
| 3,037,756 | 6/1962 | Ornitz | 106/56 |
| 3,174,872 | 3/1965 | Fisher et al. | 106/56 |
| 3,498,929 | 3/1970 | Accountius | 106/56 |

*Primary Examiner*—J. Poer
*Attorney, Agent, or Firm*—Fleit & Jacobson

[57] ABSTRACT

The proposed weld backing is prepared from a melting stock comprising 70–85 wt.% of carbon filler, 7–15 wt.% of carbon-containing binder, and 7–15 wt.% of carbide-forming component. The backing prepared from said melting stock is characterized by improved operational performances and longer service life.

3 Claims, No Drawings

BACKING FOR WELD UNDERSIDE FORMATION

The present invention relates to welding consumables and more particularly to backings for weld underside formation.

This invention may have specific application in welding strips of non-ferrous metals and alloys thereof.

Known in the prior art is a backing for weld underside formation, which backing is prepared from a stock comprising 80% of carbon filler, and 20% of carbon-containing binder.

Owing to small amount (45%) of coke residue being escaped from a binder, the aforedescribed backing is characterized by its low strenth (300–350 kg/cm$^2$), high porosity (24–27%) insignificant thermal conductivity (60 kcal/m.hr.° C), and high reactivity. The aforecited physical and mechanical characteristics of the backing adversely affect its service durability thereof. In welding metal strips, this backing provides for not more than 200 welds thereupon. High reactivity leads to rapid burn-out of the backing, which results in a more prominent bulge occurring in the weld root. In the course of subsequent rolling of welded strips, specifically with a purpose of obtain thin metal strips or foil, the aforementioned defect in the weld root causes metal rupture along the welded joint.

Short life service of the hereinbefore described backing causes frequent standstills of welding apparatus, which adversely affects their engineering and economic factors.

The present invention has as its principal object the provision of a high strength backing for the weld underside formation.

Another object of the present invention is to provide a low porosity backing for the weld underside formation.

Yet another object of the present invention is to provide a backing for the weld underside formation, said backing having insignificant thermal conductivity.

Still another object of the present invention is to provide a backing for the weld underside formation, said backing having low reactivity.

And yet still another major object of the present invention is to provide a backing for the weld underside formation, said backing being characterized by long-term service life.

These objects are accomplished by the provision of a backing for the weld underside formation, which is prepared from a melting stock comprising a carbon filler and a carbon-containing binder, said stock, according to the invention, comprising, besides said carbon filler, taken in an amount of 70–85 wt.%, and said carbon-containing binder in an amount of 7–15 wt.%, also carbideforming components in an amount of 7–15 wt.%.

The herein-proposed backing has, as compared to the prior-art backing, higher operational durability and longer life of service.

The minimum content of a filler is preferred to be maintained at 70 wt.%. The amount of a filler being less than that, the desired pressure-tightness of the backing, as well as its strength and thermal conductivity will not be achieved. The maximum amount of a filler may be maintained at 85 wt.%, the latter being obtained through introduction of a minimum amount of a binder and carbide-forming components thereinto.

The amount of a binder being less than 7 wt.%, the desired pressure-tightness and strength of the backing, as well as its other design performances, will not be achieved. With the binder content being 15 wt.%, the manufacturing process of the backing is made more complicated, its porosity tending to be higher.

With the content of carbide-forming components being less than 7 wt.%, the backing structure and its properties will be adversely affected. If the content of carbide-forming components exceeds 15 wt.%, the material of the backing will be very much like ceramics, which is characterized by low thermal stability and high abrasive resistance — the factors impairing its machining.

It is recommendable to use zirconium, taken in an amount from 7 to 10 wt.%, as one of the carbide-forming components. If the zirconium content is less than 7 wt.%, heat-, and electric conductivity of the backing will be diminished. The zirconium content being over 10 wt.%, the backing reactivity is up and its operational durability is down.

It is possible to use titanium as a carbide-forming component in an amount of 13–15 wt.%. The basis offered for the higher and lower boundary in the use of titanium will be similar to those given in the case of zirconium.

A combination of zirconium taken in an amount of 7–10 wt.%, and silicon in an amount of 2–3 wt.%, may be regarded as still another possible version of the carbide-forming component. The limits of the zirconium content have been set forth above. The minimum content of silicon, it being 2 wt.%, is based upon the feasibility of attaining the requisite plastic characteristics of a composition. With the silicon content exceeding 3 wt.%, the composition tends to develop higher plasticity, which makes it difficult to provide the desired tight-strong backing.

It is possible to use graphite, taken in an amount of 5–10 wt.%, in combination with 60–80 wt.% of oil coke, as a carbon filler. This combination makes it possible to ensure appreciable electrical conductivity of the melting stock and enables one to obtain solid, tight-strong backing. The adopted graphite-oil coke ratio is based upon the necessity of obtaining the prescribed electrical conductivity of the melting stock. With the graphite content being less than 5 wt.% and that of oil coke, less than 60 wt.% this characteristic of the melting stock is inadequate. If the graphite content is increased by more than 10 wt.% and that of oil coke by more than 80 wt.%, electrical conductivity of the stock will hardly go up at all.

It is advantageous to use high-temperature pitch as a carbon-containing binder, said pitch taken in an amount of 7–15 wt.% at a softening temperature of about 150° C. Such composition of the binder ensures solidity and prescribed operational performances of the backing. When the binder content is less than 7 wt.%, the required operational durability of the binder is not to be attained. With the amount of the binder exceeding 15 wt.%, the backing tends to develop higher porosity which deteriorates its operational performances.

Semicoke, taken in an amount of 7–15 wt.%, can also be used as a carbon-containing binder. The basis offered for the higher and lower boundary in the use of semicoke will be similar to those given in the case of high temperature pitch.

Maximum operational durability and service life of a backing are to be obtained in using stock of the following composition (wt.%):
oil coke — 60–70
graphite — 7–8
high temperature pitch — 10–15
titanium — 13–15

To obtain effective operational performance of a backing, here is another possible composition of the melting stock (wt.%):
oil coke — 65–80
graphite — 5–10
high temperature pitch — 7–15
zirconium — 7–10

Still another example of a stock to ensure high operational durability and long-term service life of a backing is the melting stock of the following composition (in wt.%):
oil coke — 70–75
graphite — 5–10
high-temperature pitch — 7–15
zirconium — 7–10
silicon — 2–3

The above-mentioned and other features and objects of the present invention and the manner of attaining them will become more apparent and the invention itself will be best understood by reference to the following detailed description of examples thereof.

There is proposed a backing for the weld underside formation. A melting stock of various compositions is likewise proposed for a backing to be prepared therefrom. The process of preparing a backing from a melting stock does not differ from the prior-art processes and is carried out as follows. A mixture of the initial melting stock stock components is simultaneously subjected to moulding and sintering operations at a temperature ranging from 500° to 700° C, and under pressure of from 200 to 400 kg/cm$^2$. Then the obtained workpiece undergoes high-temperature treatment at over 2000° C, under pressure of 200 to 300 kg/cm$^2$. The obtained workpieces are used for backings of prescribed sizes.

The stock contains a carbon filler, a carbon-containing binder, and, according to the invention, it also contains carbide-forming components, the aforecited melting stock components being taken in the following weight percent ratio:
carbon filler — 70–85
carbon-containing binder — 7–15
carbide-forming components — 7–15

The particle size of carbon filler does not exceed 300 mcm. The particle size of carbide-forming elements and that of carbon-containing binder is less than 100 mcm.

The backing for the weld underside formation, prepared from the aforedescribed melting stock, is characterized by high operational durability and long-term service life, namely: the backing strength ranges from 850 to 1200 kg/cm$^2$, its heat conductivity extends from 290 to 600 kcal/m.hr, its reactivity at 3000° C being $1.10^4 - 3.10^4$ g/cm$^2$. sec, and service life thereof being characterized by not less than 1500 high-quality, staunch welds.

Used as carbide-forming components are 7–10 wt.% of zirconium, 13–15 wt.% of titanium, and a combination of zirconium, taken in an amount of 7–10 wt.%, with 2–3 wt.% of silicon. The use of carbide-forming components within the aforeprescribed range makes it possible to increase the coke residue yield, escaped from a binder, to 85–90%, to substantially enhance heat-, and electric conductivity of the backing, and to bring down its reactivity.

Used as a carbon filler is graphite, both natural and artificial, taken in an amount of 5–10 wt.% in combination with 60–80 wt.% of oil coke. This combination ensures the provision of a tight-strong backing. Use is made of high-temperature pitch as a carbon-containing binder, said pitch taken in an amount of 7–15 wt.%, or the same amount of oil coke, ensure the desired strength, heat-, and electric conductivity of the backing.

Given below are specific examples of the present invention.

EXAMPLE 1

The melting stock, containing 70 wt.% of oil coke, 7 wt.% of graphite, 10 wt.% of high-temperature pitch, and 13 wt.% of titanium, is used for the purpose. The components are mixed at indoor temperature. The resultant mixture is moulded and sintered in a die under pressure of 300 kg/cm$^2$, and at a temperature of 600° C, and then undergoes high-temperature treatment at 2500° C, under pressure of 250 kg/cm$^2$. It has been found that the obtained backing had the strength of 1200 kg/cm$^2$, heat conductivity was 600 kcal/m.hr.° C, with reactivity thereof at 3000° C being $1.10^{-4}$ g/cm$^2$. sec. This backing was used for argon tungsten-arc welding of copper strips (5×640 mm), with two series-connected tungsten electrodes. The welding was conducted at a speed of 0.55 cm/sec, and an amperage of 380 A. The electrode was spaced 2 mm apart from the metal being welded. Under these conditions the backing provided for welding of 2980 high-quality welds.

EXAMPLE 2

The melting stock, containing 80 wt.% of oil coke, 5 wt.% of graphite, 8 wt.% of high-temperature pitch, and 7 wt.% of zirconium, is used for the purpose. The mixture of these components undergoes treatment similar to that set forth in Example 1. The resultant backing had the strength of 850 kg/cm$^2$, its heat conductivity was 320 kcal/m.hr.° C, with reactivity thereof being $3.10^{-4}$ g/cm$^2$. sec. The backing was used for argon tungsten-arc welding (with a single tungsten electrode) of brass strips (6×640 mm). The welding was conducted at a speed of 0.50 mm/sec, and an amperage of 390 A, the electrode and the material being welded were spaced 2 mm apart, the backing provided for 1950 high quality welds.

EXAMPLE 3

The melting stock being used for the purpose contains 75 wt.% of oil coke, 6 wt.% of graphite, 10 wt.% of semicoke, 7 wt.% of zirconium, and 2 wt.% of silicon. The mixture thereof undergoes treatment similar to that set forth in Example 1. Thus, obtained backing had the strength of 1100 kg/cm$^2$, its heat conductivity was 300 kcal/m.hr.° C, with reactivity thereof being $1.10^{-4}$ g/cm$^2$. sec. The welding of brass strips (15×600 mm), (the welding process being similar to that described in Example 1), resulted in 2450 high-quality welds.

EXAMPLE 4

The melting stock being used in this case contains 62 wt.% of oil coke, 8 wt.% of graphite, 15 wt.% of high-temperature pitch and 15 wt.% of titanium. The mixture of these components undergoes treatment similar to that set forth in Example 1. The backing strength was 1050 kg/cm², its heat conductivity was 560 kcal/m.hr.° C. This backing was used for argon tungsten-arc welding of copper strips (5×640) with two series-connected tungsten electrodes. The welding process is similar to that described in Example 1. The backing provided for 2800 high quality welds.

EXAMPLE 5

The melting stock being used for the purpose contains 68 wt.% of oil coke, 7 wt.% of graphite, 15 wt.% of high temperature pitch and 10 wt.% of zirconium. The mixture of these components undergoes treatment similar to that set forth in Example 1. The backing had the strength of 980 kg/cm², its heat conductivity was 350 kcal/m.hr.° C, with reactivity thereof being $3.10^{-4}$ g/cm². sec. The welding of brass strips (6×640 mm) with the use of a single tungsten electrode (the welding process being similar to that described in Example 2), resulted in 1963 welds.

EXAMPLE 6

The melting stock being used in this case contains 70 wt.% of oil coke, 10 wt.% of graphite, 7 wt.% of semicoke, 10 wt.% of zirconium, and 3 wt.% of silicon. The mixture of these components undergoes treatment similar to that set forth in Example 1. The backing strength was 1000 kg/cm², its heat conductivity was 290 kcal/m.hr.° C, with reactivity thereof being $1.5.10^{-4}$ g/cm². sec. The welding of brass strips (5×600 mm) (the welding process being similar to that described in Example 1) resulted in 2320 high-quality welds.

All-round check-out test of the herein proposed backing, carried out in the course of welding the strips of non-ferrous metals and alloys thereof, pointed to the fact that the number of welds, as compared to the prior-art backing, has increased from 200 to 3000, their quality being likewise improved. The proposed backing provides for welding with but an insignificant bulge occurring in the resultant weld root, which rules out the possibility of rupture along the welded joint in the course of subsequent rolling of welded strips.

What is claimed is:

1. A backing for the weld underside formation, said backing being prepared from a melting stock and consisting essentially of, in percentages by weight:
   oil coke — 60–70%
   graphite — 7–8%
   high-temperature pitch — 10–15%
   titanium — 13–15%.

2. A backing for the weld underside formation, said backing being prepared from a melting stock, and consisting essentially of, in percentages by weight:
   oil coke — 65–80%
   graphite — 5–10%
   high-temperature pitch — 7–10%
   zirconium — 7–10%.

3. A backing for the weld underside formation, said backing being prepared from a melting stock, and consisting essentially of, in percentages by weight:
   oil coke — 70–75%
   graphite — 5–10%
   semicoke — 7–10%
   zirconium — 7–10%
   silicon — 2–3%.

* * * * *